United States Patent
Hunger

Patent Number: 5,722,678
Date of Patent: Mar. 3, 1998

[54] TRAILER COUPLING ASSEMBLY

[76] Inventor: Walter Hunger, Otto-Nagler-Strasse 13, D-97074 Wuerzburg, Germany

[21] Appl. No.: 599,325

[22] Filed: Feb. 9, 1996

[30] Foreign Application Priority Data

Feb. 11, 1995 [DE] Germany .................. 195 04 591.2

[51] Int. Cl.$^6$ ............................................... B60D 1/00
[52] U.S. Cl. .............................. 280/478.1; 280/416.1; 172/248
[58] Field of Search ............. 280/478.1, 416.1, 280/415.1, 504, 491.1, 493, 491.3; 172/248

[56] References Cited

U.S. PATENT DOCUMENTS

| | | | |
|---|---|---|---|
| 2,805,082 | 9/1957 | Erickson | 280/478.1 |
| 2,918,310 | 12/1959 | Carson | 280/491.3 X |
| 2,968,494 | 1/1961 | Klouda | 280/415 |
| 3,066,952 | 12/1962 | Price | 280/415 |
| 3,243,200 | 3/1966 | Roenfeldt | 172/248 |
| 4,022,490 | 5/1977 | Rocksvold | 280/500 |
| 5,193,625 | 3/1993 | Goll | 172/248 |
| 5,560,630 | 10/1996 | Phares et al. | 280/416.1 |

FOREIGN PATENT DOCUMENTS

| | | | |
|---|---|---|---|
| 620176 | 4/1927 | France | 280/478.1 |
| 680693 | 9/1939 | Germany | |
| 7332914 | 12/1973 | Germany | B60D 1/14 |
| 3049449 A1 | 12/1980 | Germany | B60D 1/00 |
| 763778 | 1/1955 | United Kingdom | |

Primary Examiner—Christopher P. Ellis
Attorney, Agent, or Firm—Claude A. S. Hamrick

[57] ABSTRACT

A coupling device for connecting a trailer to a towing vehicle is provided. The coupling comprises a drawbar with a first drawbar eye having a first inner diameter, and at least a second drawbar eye having a second inner diameter. A coupling pin of a coupling element on a towing vehicle is adapted to be stucked through one of the two drawbar eyes for coupling the drawbar to the trailer coupling element. The drawbar is adapted to be pivoted by means of a swivel-joint and to swivel in a horizontal plane about at least 180°, and to be secured to said coupling. Further, the trailer coupling element comprises, at its free end, two horizontal legs arranged one upon another between which the drawbar is pivoted, and at least one releasable locking pin is provided being stucked through the two legs and through one of the two drawbar eyes located between the legs for locking the drawbar at the forked drawbar (FIG. 2).

4 Claims, 3 Drawing Sheets

TRAILER COUPLING ASSEMBLY

FIELD OF THE INVENTION

The invention, generally, relates to the field of coupling devices for connecting a trailer to a towing vehicle.

More specifically, the invention relates to a coupling for trailers comprising a drawbar with a first drawbar eye having a first inner diameter, and at least a second drawbar eye having a second inner diameter, a coupling pin of a coupling element on a towing vehicle being adapted to be stuck through one of the two drawbar eyes for coupling the drawbar to the trailer coupling element, the drawbar being adapted to be pivoted by means of a swivel-joint and to swivel in a horizontal plane about at least 180°, and to be secured to said coupling.

BACKGROUND OF THE INVENTION

A coupling of the afore-mentioned kind is disclosed in DE 30 49 449 A1.

Drawbar assemblies are used for transmitting a horizontal tractive force from a towing vehicle to a trailer and are as such a structural component of the trailer. The drawbar assembly as a whole is rigid and suited for being used as tractive force transmission means for high tractive forces. In this context the drawbar assembly is a component of the trailer being of great importance to safety and is, therefore, subjected to a design certification.

In general, the drawbars comprise, at their free end, a drawbar eye. The drawbar eye is used for coupling the drawbar to a trailer coupling provided at the towing vehicle. The trailer coupling, for its part, comprises a coupling pin being adapted to be stuck through the drawbar eye. Coupling pin and drawbar eye consequently constitute a releasable connection between the drawbar and the trailer coupling. In this respect it is very important that the coupling pin has not too much clearance in the drawbar eye for providing a continuous load transmission without jerks occurring between the towing vehicle and the trailer. This implies that the inner diameter of the drawbar eye and the outer diameter of the coupling pin have to correspond to each other such that the coupling pin engages the drawbar eye in a form-fitting manner.

For achieving the highest possible compatibility between the various kinds of trailers and their drawbars on the one hand and the various kinds of towing vehicles and their trailer couplings on the other hand, the inner diameter of the drawbar eye and the outer diameter of the coupling pin are standardized. In Germany the standard (DIN 74051) specifies the inner diameter of the drawbar eye and the outer diameter of the coupling pin to be 40 mm. To date, however, there is no international standard except a European standard EG 94/20 for 50 mm coupling pin diameter, and, hence, drawbars and trailer couplings having different diameters can be found at international level. At present, trailer couplings with 40 mm and 50 mm coupling pin diameter, and, accordingly, drawbars with drawbar eye inner diameters of 40 mm and 50 mm are in operation. Therefore, the problem arises that a drawbar having a drawbar eye inner diameter of 40 mm is not compatible with a towing vehicle, the trailer coupling of which comprises a coupling pin of 50 mm diameter. The same holds true for vice versa.

This inevitably results in the disadvantage that the compatibility of the drawbars with one drawbar eye is limited with respect to the coupling pins of the trailer coupling. In case the coupling pin diameters will also be internationally standardized in future, this means that trailers manufactured prior to the international standardization have to be subsequently subjected to a replacement of the drawbar, if the drawbar comprises a drawbar eye having not an inner diameter corresponding to the standardized diameter of the coupling pin.

According to a trailer coupling marketed under the designation GSZ in the name of the Grau GmbH company, Heidelberg, Germany, the coupling is provided at its front end with two legs arranged parallel to and distant from one another, and between which a bar is pivoted about a horizontal axis at substantially right angles to the direction of trailer travel.

The bar is provided at each of its ends with a drawbar eye, one of the drawbar eyes having an inner diameter of 40 mm and the other having an inner diameter of 50 mm. The bar is buckled about an angle of about 10° on both sides of the horizontal axis of rotation within a vertical plane. Thus, if the front end of the bar points in a forward direction, the rear end of the bar is bent downwardly out of the horizontal plane about an angle of about 10°.

At a distance behind both legs at the front end of the coupling and between those legs, a cross arm is attached by welding, comprising a forward-pointing shoe having mating surfaces which are also canted with respect to the horizontal plane about an angle of 10°. In the position as already described the rear end of the bar abuts from below on the oblique mating surface of the cross arm and is locked thereto by means of a ring screw.

If the coupling shall be used for the respective other coupling pin diameter, one releases the wing screw and pivots the bar about approximately 160° in a vertical plane, until the previously forward-pointing free end of the bar comes to rest on the upper canted mating surface, and until the previously lower free end of the bar having been abutting on the cross arm is swivelled in the horizontal forward direction.

By that the prior art device has a relatively complicated structure and requires a cross arm with precisely aligned mating surfaces. Further, only arrangements having exactly two different eye diameters are possible. Finally, the way of fixing the respective rear arm of the bar is difficult because the wing screw used for it can get lost. Furthermore, it is troublesome that for changing the eyes the wing screw has to be grasped from below.

DE 30 449 A1 discloses a multiple eye trailer turnstile. According to this prior art device a drawbar eye arrangement is attached to the free end of a trailer drawbar, that is by means of vertically axled swivel-joint. The drawbar eye arrangement comprises several free arms comprising eyes at their free ends having different diameters. By rotating the turnstile so constituted within a horizontal plane, the one eye having the desired diameter can be positioned in free elongation of the drawbar for being coupled to a trailer coupling of a towing vehicle. For locking the turnstile in a determined angular position, several balls engage matching recesses of the drawbar on one hand and of the turnstile on the other hand. An elastic clamping sleeve is provided creating a vertical tractive power along a conical surface of a pivot shaft in order to brace this form-fitting arrangement in the vertical direction.

This prior art device has the disadvantage that the arms of the turnstile which are not used for operation protrude laterally. In case the turnstile only comprises two opposite arms, the rear unutilized arm loosely lies on top of the drawbar. If, for instance, a vertical load acts from above on the front arm, this arm possibly can break off, since the loose rear arm may be lifted off in an upward direction if the front arm is pushed down. Further, the form-fitting ball connection assures to an only limited extent a lock of the turnstile in an angular position in the horizontal plane. For, if the articulated train comprised of the towing vehicle and the trailer moves, for instance, along a sharp bent, in particular on a steep mountain road, an important torque is exerted on the turnstile, and as a result, the retention force of the balls can be overcome and, as a result, the turnstile rotates undesireably. This can affect the steering geometry of the entire arrangement and can jeopardize the operational reliability.

Finally, the bracing device in the vertically axled pivot bearing is relatively expensive and difficult to be handled, if the turnstile shall be brought into another operating position.

DE 680 693 discloses a trailer coupling for motor vehicles. This prior art trailer coupling is provided with a rod on the trailer end side, the free end of which comprises two horizontal legs disposed one upon another. A free end of a drawbar eye may be stuck in between these legs. The other free end of the drawbar eye can be connected, as is known per se, to a trailer coupling of a towing vehicle.

The free end of the rod is provided with so-called filling pieces in the region of the two horizontal legs, one of which houses a vertically axled coupling pin, for coupling drawbar eyes having different eye diameters to the trailer. The coupling pin engages the two horizontal legs and the eye at the free end of the drawbar introduced between the legs. The filling pieces fulfill the function of an adaptor and may be chosen according to the diameter of the eye.

It is, therefore, an object underlying the invention to improve a forked drawbar of the kind specified at the outset such that the operation and the operational reliability of the forked drawbar is far simplified while maintaining the enhanced compatibility between the towing vehicles and the trailers having different coupling pin diameters, as it is known per se.

SUMMARY OF THE INVENTION

According to the invention this object is achieved in that the trailer coupling element comprises, at its free end, two horizontal legs arranged one upon another between which the drawbar is pivoted, and that for locking the drawbar at the forked drawbar at least one releasable locking pin is provided being stuck through the two legs and through one of the two drawbar eyes located between the legs.

The invention has the advantage that the swivel joint is kept from breaking, which may be caused by forces vertically acting on the drawbar eye coupled to the towing vehicle coupling element and enhanced by the rod acting as a lever arm, whereby the swivel joint is subjected to transverse forces. In contrast to that the solid legs encompass the rear drawbar arm and effectively limit the lever action.

Further, the invention has the advantage that a reliable rigid connection between the drawbar eye and the coupling is achieved such that the coupling according to the invention completely meets the requirements generally made in view of its operational reliability and functioning. A releasable securing pin is capable of locking the bar. This is achieved by having the locking pin stick through the drawbar eye unutilized for coupling on the one hand and through a corresponding opening in the trailer coupling element on the other hand, such that the bar is blocked against pivoting by securing it at two points, namely the swivel joint and the securing pin. Furthermore, the lock may be simply released by removing the pin, if the bar has to be swivelled about 180° in order to prepare the coupling for another operation.

In a preferred embodiment the securing pin comprises a first pin portion having a diameter corresponding to the first inner diameter of the first drawbar eye, and a second pin portion having a second diameter corresponding to the second inner diameter of the second drawbar eye.

This measure has the advantage that only one securing pin is required for securing the bar. As a result of its shape the securing pin may be form-fittingly stuck through the first drawbar eye as well as through the second drawbar eye, thus achieving a securing of the bar without any clearance in both cases.

In a preferred embodiment a first opening is provided in that a first opening is provided in the first leg and a second opening is provided in the second leg, the first opening having a diameter corresponding to the first inner diameter and the second opening having a diameter corresponding to the second inner diameter, the first drawbar eye or the second drawbar eye may be moved into a position between the first opening and the second opening, and the securing pin is stuck through the first opening, the first drawbar eye or the second drawbar eye and the second opening.

In combination with the advantageous design of the securing pin having two corresponding pin portions, the bar supporting the two drawbar eyes can be form-fittingly secured at the trailer coupling element in both cases while the drawbar is coupled either by the first drawbar eye or by the second drawbar eye to the trailer coupling of the towing vehicle.

In a further preferred embodiment of the invention the swivel joint comprises a demountable pivot shaft.

As already mentioned the variability of the coupling may be further enhanced by exchanging the drawbar comprising the first and the second drawbar eye for another bar correspondingly comprising other drawbar eyes.

Further advantages may be taken from the description and the enclosed drawing.

It goes without saying that the features mentioned before and those that will be explained hereinafter may not only be used in the combination as particularly mentioned but may also be used in other combinations or alone without leaving the scope of the present invention.

BRIEF DESCRIPTION OF THE DRAWINGS

An embodiment of the invention is depicted in the drawing and will be described in the subsequent description.

DETAILED DESCRIPTION OF THE PREFERRED EMBODIMENT

Figure 1:
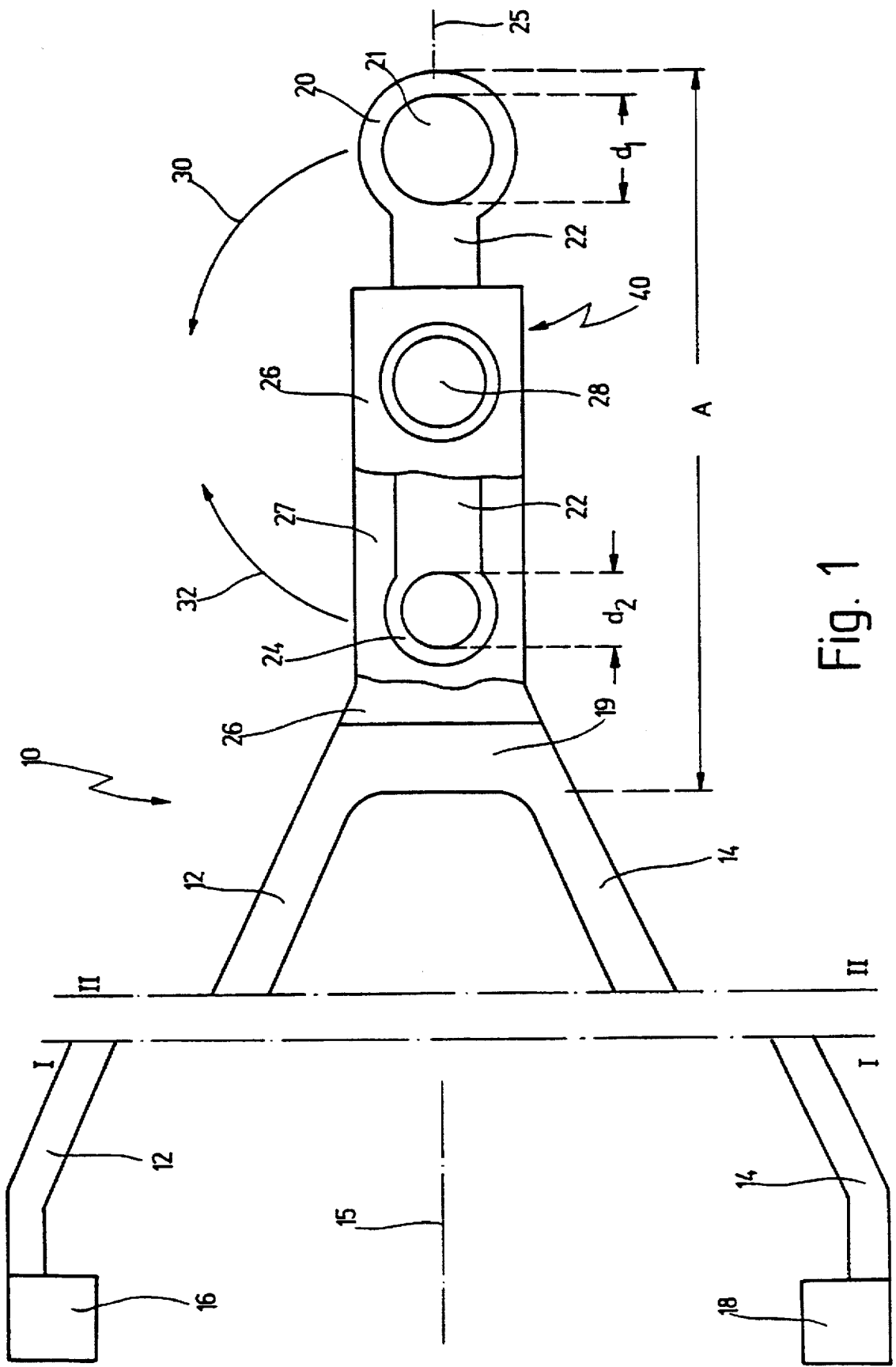
FIG. 1 shows a top plan view, partially sectional of a coupling according to the invention.

In FIG. 1 a trailer coupling assembly identified as a whole by reference numeral 10 is depicted, the depiction being discontinued along lines I—I and II—II. Assembly 10 is generally used as a horizontal tractive force transmission device between a horizontally towed trailer, on the one hand and a towing vehicle on the other hand. The trailer and the towing vehicle are not shown in FIG. 1. Assembly 10 is a component of the trailer and, therefore, permanently fastened to the trailer. Consequently, a releasable connection is usually only established between assembly 10 and the towing vehicle.

Assembly 10 comprises a forked drawbar having two arms 12 and 14. Arms 12 and 14 are fastened to the trailer by means of fastening devices 16 and 18 generally known and here not described in detail. The fastening of the forked drawbar to the trailer may be either rigid or assisting the steering mechanism of the trailer.

Arms 12 and 14 converge, as viewed from the trailer to the towing vehicle, towards a longitudinal centerline 15 of the forked drawbar 10 and meet in a solid block 19.

Assembly 10 comprises a first drawbar eye 20. Drawbar eye 20 is formed as a ring having a circular opening 21 defining a first inner diameter $d_1$ of drawbar eye 20. Inner diameter $d_1$ of drawbar eye 20 amounts to 50 mm for instance. Further, drawbar eye 20 is formed as a head of a drawbar or rod 22. Rod 22 comprises a second drawbar eye 24 disposed at its opposite head also being formed as a ring having a circular opening. This circular opening defines a second inner diameter $d_2$ of second drawbar eye 24 amounting to, for instance, 40 mm.

Center points of the circular openings of first drawbar eye 20 and of second drawbar eye 24 are positioned on a longitudinal centerline 25 of rod 22. Midplanes of first drawbar eye 20 and of second drawbar eye 24 are positioned in a common plane.

According to the broken depiction as shown in FIG. 1 rod 22 and drawbar eye 24 are partially disposed under a leg 26 of assembly 10.

Rod 22 and, by this, first drawbar eye 20 and second drawbar eye 24, both integral with rod 22 are capable of being swivelled in a horizontal plane about a rotation axis 28 about 360° in the direction of arrows 30 and 32. In particular, first drawbar eye 20 and second drawbar eye 24 can be brought in a predetermined coupling position with respect to assembly 10.

It goes without saying that instead of a straight rod 22 having two drawbar eyes 20 and 24 at the two free ends yet another element may be inserted having more than two drawbar eyes at its periphery. Such an element can comprise, as viewed from above, the shape of a star, a disk or likewise.

Pivoted rod 22 comprising first drawbar eye 20 and second drawbar eye 24 may be rigidly locked to the forked drawbar, such that assembly 10 as a whole is rigid as it is necessary when the trailer is towed by the towing vehicle. The securing of rod 22 will be explained with reference to subsequent FIGS. 2 and 3. In the secured state longitudinal centerline 25 of rod 22 is in alignment with longitudinal centerline 15 of assembly 10.

Figure 2:
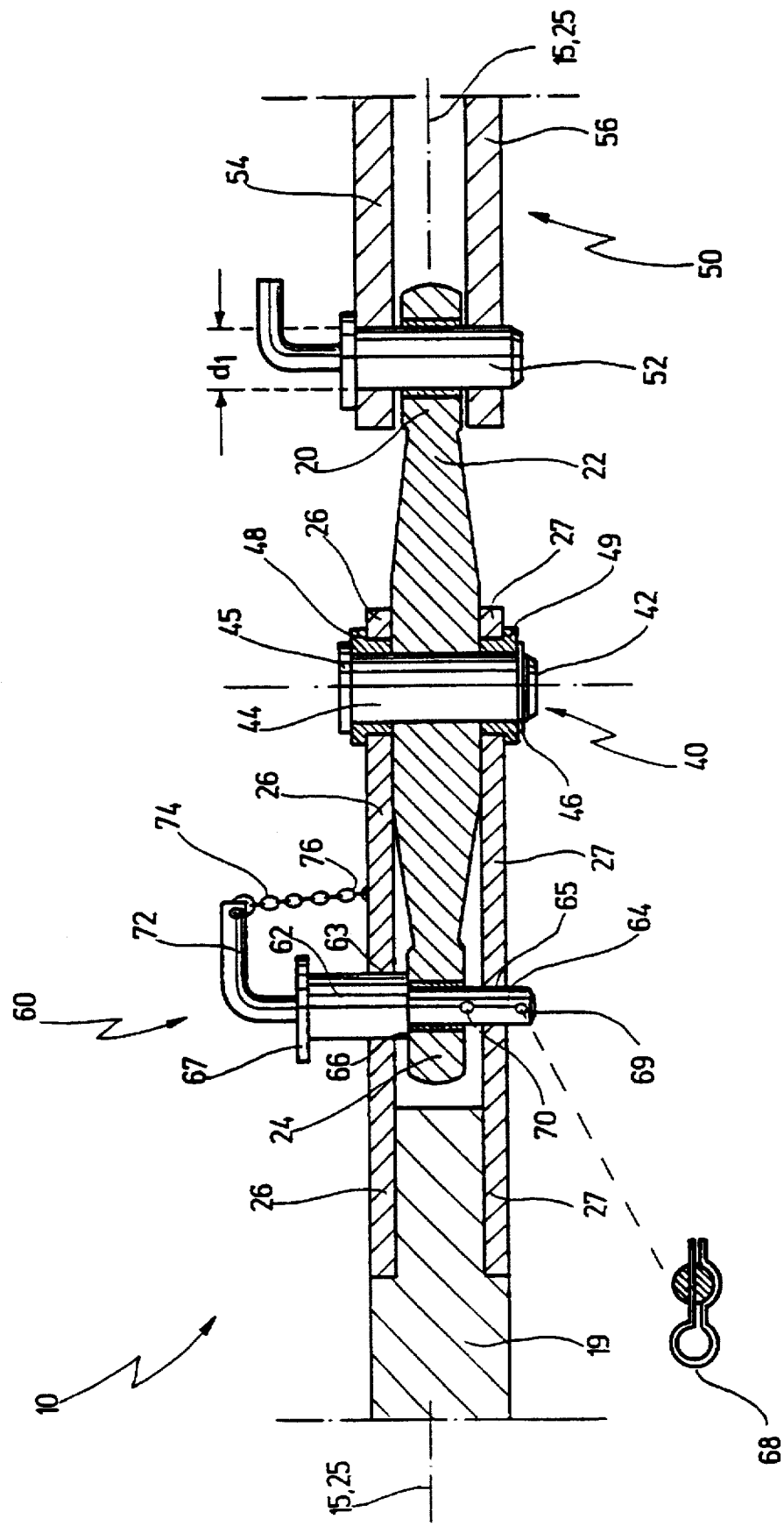
FIG. 2 is a side elevational sectional view of the coupling of FIG. 1 in a first mode of operation.
Figure 3:
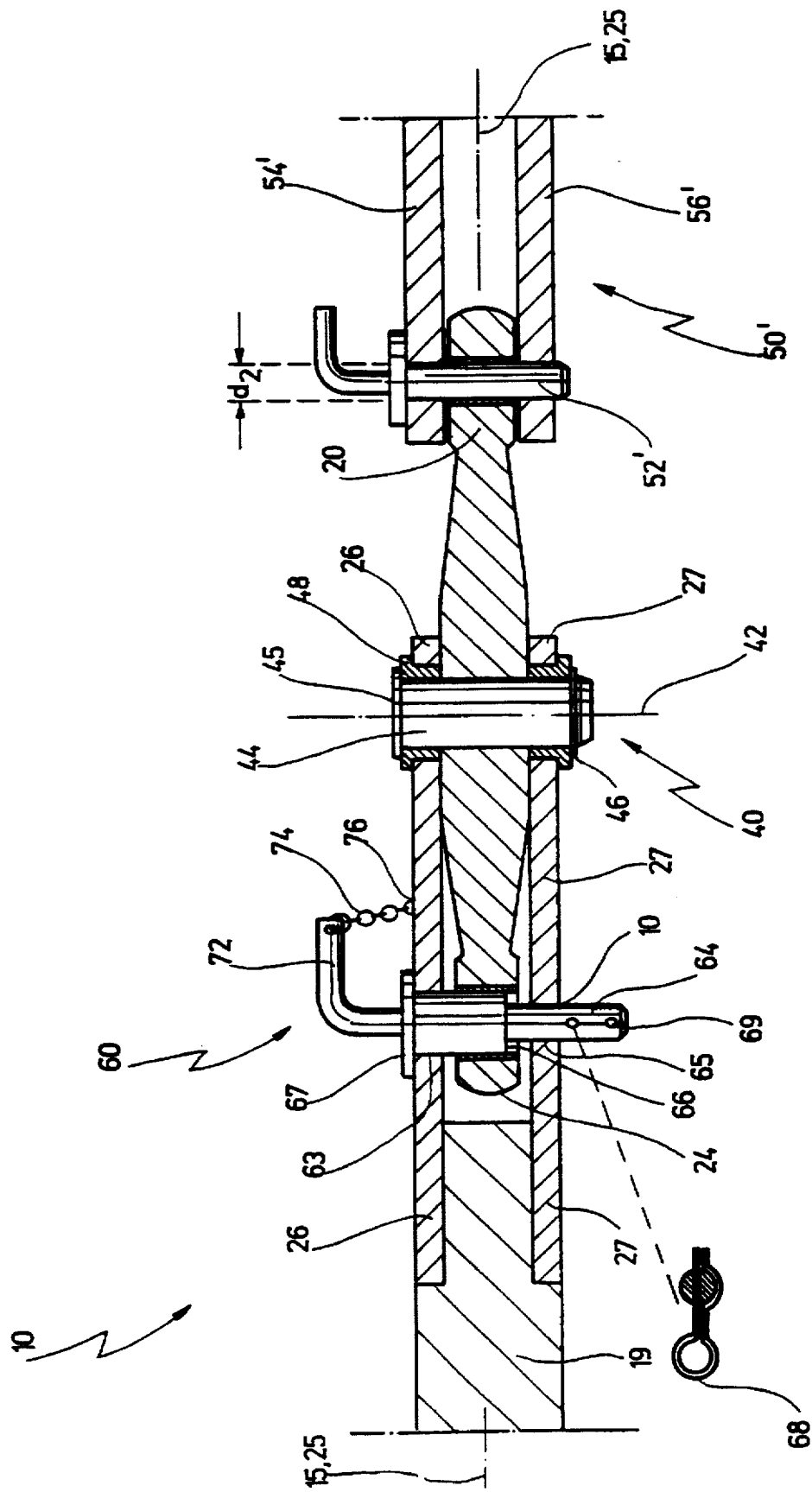
FIG. 3 shows a side elevational sectional view of the coupling of FIG. 1 in a second mode of operation.

In FIGS. 2 and 3 two distinct modes of operation of assembly 10 are described in more detail.

FIG. 2 shows a side elevational sectional view of assembly 10 along longitudinal centerline 15 or to be more precise in a region of assembly 10 of FIG. 1 defined by A.

Assembly 10 in addition to upper leg 26 comprises a further leg 27, both legs 26, 27 being integral with solid block 19 of the forked drawbar joining arms 12 and 14.

Rod 22 is pivoted between legs 26 and 27 by means of a swivel joint 40, a centerline 42 of swivel joint 40 defining rotating axis 28 in FIG. 1. Rod 22 can be swivelled about centerline 42 in a plane normal to the drawing plane. In the region of swivel joint 40 rod 22 is journalled between legs 26 and 27 without vertical clearance.

Swivel joint 40 comprises a pivot stem 44 having a head 45, pivot stem 44 being stuck through upper leg 26, rod 22 and lower leg 27. A securing element 46 protects pivot stem 44 from falling out. Pivot stem 44 may also comprise a thread to which a self-securing castle nut is screwed on instead of securing element 46 as to facilitate removing pivot stem 44, for instance, in order to exchange rod 22 having first drawbar eye 20 and second drawbar eye 24 for another rod.

Pivot stem 44 is tightly journalled in legs 26 and 27. For that purpose, simple bores may be provided in legs 26 and 27. For a better journalling of pivot stem 44 specific bearing elements, for instance adjusting rings 48, 49, may be used as exemplarily depicted in FIG. 2. Rod 22 is capable of being swivelled about pivot stem 44 about 360°.

Centerline 42 of swivel joint 40 centrically and perpendicularly intersects longitudinal centerline 15 of rod 22, that means drawbar or rod 22 is divided in two arms of equal length in the direction of longitudinal centerline 15.

FIG. 2 depicts a situation where a towing vehicle coupling element 50 comprises a coupling pin 52 having a diameter corresponding to the inner diameter $d_1$ of first drawbar eye 20. For this mode of application, corresponding to the situation of FIG. 1, rod 22 is swivelled such that drawbar 22 with first drawbar eye 20 of inner diameter $d_1$ can be inserted between two jaws 54, 56 of coupling element 50 and coupling pin 52 can be stuck through first drawbar eye 20 without clearance.

Prior to coupling assembly 10 with first drawbar eye 20 to coupling element 50, rod 22 is rigidly secured. For that purpose, securing or locking pin 60 is provided having two pin portions 62 and 64, the first pin portion 62 having a diameter corresponding to inner diameter $d_1$ of first drawbar eye 20 and second pin portion 64 having a diameter corresponding to inner diameter $d_2$ of second drawbar eye 24. Correspondingly, first opening 63 of diameter $d_1$ is provided in upper leg 26 of assembly 10 and a second opening 65 of diameter $d_2$ is provided in upper leg 27.

For locking rod 22 in the mode of operation depicted in FIG. 2, locking pin 60 with second pin portion 64 is stuck through second drawbar eye 24 and second opening 65 of lower leg 27 without clearance. At the same time a shoulder 66 of locking pin 60 disposed between first pin portion 62 and second pin portion 64 abuts on second drawbar eye 24. First pin portion 62 is stuck in first opening 63 of upper leg 26 without clearance.

In combination with swivel joint 40 locking pin 60 effects a rigid lock of rod 22 thus rendering assembly 10 as a whole rigid.

Locking pin 60, in turn, is secured by a split-pin 68 below lower leg 27 by sticking split-pin 68 through a lower opening 69 of second pin portion 64 of locking pin 60. After that assembly 10 is ready for being coupled to coupling element 50 of the towing vehicle. Furthermore, locking pin 60 is secured against loss by means of a chain 74 attached to a operating handle 72 and to a fastening ring 76 of upper leg 26.

In FIG. 3 assembly 10 being the same as in FIG. 2 is depicted for the mode of operation where a coupling element 50' comprises a coupling pin 52' having a diameter $d_2$. In this case, second drawbar eye 24 is swivelled such as to couple assembly 10 by second drawbar eye 24 of inner diameter $d_1$. By this, first drawbar eye 20 is automatically swivelled between legs 26 and 27.

Now first pin portion of locking pin 60 may be stuck in first drawbar eye 20 without clearance. A head 67 now abuts on upper leg 26 and prevents locking pin 60 from slipping through. In this case locking pin 60 is secured against falling out by sticking split-pin 68 through a second opening 70 of second pin portion 64.

I claim:

1. A trailer coupling assembly comprising:

first coupling means arranged at a rear end of a towing vehicle and having a coupling opening with coupling holes;

second coupling means arranged at a front end of a trailer and having two horizontal legs defining between them an open gap, said legs having free terminal ends provided with bearing means defining a swivel axis, said legs having, further, a first and a second securing opening, respectively at a distance from said bearing means, said securing openings being arranged coaxially along a common axis;

a drawbar having
- a central pin journalled in said bearing means for allowing said drawbar to be swiveled about said swivel axis by at least 180°,
- a first arm having a first terminal end with a first eye therein of a first predetermined diameter,
- at least a second arm having a second terminal end with a second eye therein of a second predetermined diameter, a coupling pin for coupling one of said drawbar arms to said coupling opening with said coupling pin being inserted through said eye of said one of said drawbar arms and through said coupling holes;

a securing pin for securing another of said drawbar arms in said open gap with said securing pin being inserted through said eye of said other of said drawbar arms and through said securing openings.

2. The trailer coupling of claim 1, wherein said securing pin has a first pin portion having a diameter equal to said first predetermined diameter, and has a second pin portion having a diameter equal to said second predetermined diameter.

3. The trailer coupling of claim 2, wherein said first securing opening has a diameter equal to said first predetermined diameter and said second opening has a diameter equal to said second predetermined diameter for allowing said drawbar to be secured with either said first or said second arm between said legs of said second coupling means and either said second or said first arm to be coupled to said first coupling means.

4. The trailer coupling of claim 1, wherein said bearing means are designed to be detachable.

* * * * *